(12) United States Patent
Monnier et al.

(10) Patent No.: US 10,221,280 B2
(45) Date of Patent: Mar. 5, 2019

(54) ACRYLATED OR METHACRYLATED URETHANE OLIGOMER WITHOUT ISOCYANATE

(71) Applicant: Arkema France, Colombes (FR)

(72) Inventors: Guillaume P. Monnier, Avrigny (FR); Christophe Duquenne, Paris (FR)

(73) Assignee: ARKEMA FRANCE, COLOMBES (FR)

( * ) Notice: Subject to any disclaimer, the term of this patent is extended or adjusted under 35 U.S.C. 154(b) by 342 days.

(21) Appl. No.: 14/893,616

(22) PCT Filed: May 20, 2014

(86) PCT No.: PCT/FR2014/051173
§ 371 (c)(1),
(2) Date: Nov. 24, 2015

(87) PCT Pub. No.: WO2014/188116
PCT Pub. Date: Nov. 27, 2014

(65) Prior Publication Data
US 2016/0122473 A1    May 5, 2016

(30) Foreign Application Priority Data

May 24, 2013 (FR) ...................................... 13 54685

(51) Int. Cl.
| C08G 71/00 | (2006.01) |
| C08G 71/04 | (2006.01) |
| C08L 75/16 | (2006.01) |
| C09D 175/16 | (2006.01) |
| C08L 75/14 | (2006.01) |

(52) U.S. Cl.
CPC .............. C08G 71/04 (2013.01); C08L 75/14 (2013.01); C08L 75/16 (2013.01); C09D 175/16 (2013.01)

(58) Field of Classification Search
CPC ......... C08G 71/04; C08L 75/14; C08L 75/16; C09D 175/16
See application file for complete search history.

(56) References Cited

U.S. PATENT DOCUMENTS

| 4,758,615 | A | | 7/1988 | Engel et al. | |
| 5,292,833 | A | * | 3/1994 | Grahe ................. | C08G 59/182 525/423 |
| 8,017,719 | B2 | * | 9/2011 | Bernard ............... | C09D 175/12 525/462 |
| 2006/0229419 | A1 | * | 10/2006 | Eswarakrishnan .... | C08G 59/56 525/529 |
| 2013/0004677 | A1 | | 1/2013 | Hwang et al. | |

FOREIGN PATENT DOCUMENTS

GB    1 495 555    12/1977

* cited by examiner

*Primary Examiner* — Michael L Leonard
(74) *Attorney, Agent, or Firm* — Christopher R. Lewis

(57) ABSTRACT

The invention relates to a monofunctional or multifunctional acrylated or methacrylated urethane oligomer where said urethane bond is obtained without use of isocyanate and by the carbonate-amine reaction between a cyclic carbonate and a monoamine or polyamine, with subsequently the conversion of the hydroxyls in the β position with respect to the urethane bond into ester-acids by reaction with a cyclic anhydride, which reaction is followed by the conversion of said acid functional groups into acrylated or methacrylated end groups by reaction with a polyepoxide compound in the presence of acrylic or methacrylic acid.

The invention also relates to a preparation process. Said oligomer is used as crosslinkable binder for a functionality of at least 2 in coating, molding, leaktightness agent or sealing compositions or, if monofunctional, as macromonomer in polymerizable compositions for the production of grafted polymers.

25 Claims, No Drawings

ACRYLATED OR METHACRYLATED URETHANE OLIGOMER WITHOUT ISOCYANATE

CROSS-REFERENCE TO RELATED APPLICATIONS

This application is a national stage application under 35 U.S.C. § 371 of PCT/FR2014/051173, filed May 20, 2014, which claims benefit to French patent application FR 13.54685, filed May 24, 2013.

The invention relates to novel acrylated or methacrylated urethane oligomers which are monofunctional or multifunctional in end acrylate and/or methacrylate groups, with said urethane bond being obtained without any use of isocyanate, by a carbonate-amine reaction, followed by modification of the hydroxyls in the β position with respect to the urethane bond and successive reactions until said acrylate and/or methacrylate groups have been obtained. The invention relates in particular to a process for the preparation of said oligomers, without any use of starting materials toxic to human health and harmful to the environment in general, such as isocyanates. The invention also relates to the use of said oligomers, in particular multifunctional oligomers, as crosslinkable binders for compositions for coatings, for molding or for leaktightness agents or as macromonomer in the case of monofunctional oligomers.

The current synthesis of (meth)acrylate urethane oligomers resorts to the use of isocyanate compounds which are di- or polyisocyanates. These compounds are toxic and handling thereof is dangerous and thus problematic, requiring particular and strict precautions for human health and for the environment in general. Furthermore, the urethanization reaction (formation of a urethane bond by reaction of an alcohol with an isocyanate) commonly uses tin-based catalysts, which compounds are also toxic and harmful to the environment.

Recent years have seen major growth in the carbonate-amine reaction as alternative route for the formation of a urethane bond but without use of isocyanates. This reaction makes it possible to access β-hydroxylated urethane compounds without the release of secondary compounds (for example, methanol with the use of dimethyl carbonate) when it involves a cyclic carbonate, that is to say a ring having 5 or 6 atoms. "Non-Isocyanate Polyurethane" (abbreviated to NIPU) compounds are then obtained. The carbonates are regarded as not very dangerous. Moreover, it is possible to prepare these carbonates by addition of $CO_2$ to an epoxy functional group of an epoxide compound. The preparation of said carbonates thus consumes $CO_2$, which is a greenhouse gas. Thus, subject to the adoption of this method of preparation, the replacement of the alcohol-isocyanate reaction by the carbonate-amine reaction is beneficial both with regard to safety and to the environment.

Patent application US 2013/0004677 describes the synthesis of (meth)acrylate urethane oligomers for photocrosslinking applications The amine-functionalized polyurethane prepolymer which results from the amine-carbonate reaction is a polyurethane chain with a urethane repeat unit. This chain elongation of the prepolymer increases its molecular weight and thus its viscosity in solution. Moreover, the methacrylate group is obtained by a Michael addition reaction of the amine functional groups of said NIPU prepolymer with the acrylate group (only) of an acrylated glycidyl methacrylate, which results in a dimethacrylate NIPU which is not very reactive by photocrosslinking. Moreover, owing to the fact that the Michael reaction is limited to the acrylate groups alone, it is very difficult to obtain acrylate end groups as it is impossible, starting from a diacrylate, to avoid the formation of chain elongation (doubling or tripling or more of the molecular weight of the NIPU prepolymer) and thus a rapid increase in the viscosity of final products. This places several limitations on the products described in this document. Moreover, the hydroxyls in the β position with respect to each urethane bond formed in said NIPU prepolymer will have a tendency to also add to the acrylate groups, which renders even more difficult the control of the reaction and of the structure and its reproducibility.

There is thus a need for novel acrylate or methacrylate urethane oligomers with a structure which is well controlled and reproducible in terms of chain length and of functionality, it being possible for these oligomers to be monofunctional, both in acrylates and in methacrylates, and/or in particular oligomers which are multifunctional in acrylates and/or methacrylates, and more particularly with a functionality of at least 3, which are suitable for crosslinking by the UV radical route or by the peroxide route or by a dual route, the dual route being a mixed route using a peroxide by the thermal route and a photoinitiator by the UV route.

The present invention makes it possible in particular to access such acrylate or methacrylate urethane oligomers, without restriction, while using starting materials which are nontoxic and friendly with regard to human health and the environment in general and which are readily available commercially.

These oligomers can more particularly exhibit a satisfactory rate of crosslinking under UV radiation and can make it possible to obtain crosslinked finished products, in particular for coatings, having a good flexibility and a hardness which can vary as a function of the choice of the reactants with a good compromise in performance.

The first subject matter of the invention relates to the novel urethane oligomer which is monofunctional or multifunctional in urethane groups.

The invention also covers a specific preparation process without any isocyanate.

It also relates to polymerizable compositions comprising said oligomer which can be more particularly crosslinkable when the oligomer is multifunctional, for coatings, molded compositions or for leaktightness agents or for the preparation of grafted polymers for monofunctional oligomer. The related uses of said oligomer for this purpose as crosslinkable binder or as macromonomer also form part of the invention, as do the finished products which result therefrom.

Thus, the first subject matter of the present invention relates to a urethane oligomer which may be linear or branched, carrying at least p acrylate or methacrylate end groups, with said urethane bond being obtained without use of isocyanate by the carbonate-amine reaction between n mol of cyclic monocarbonate (III), subsequently also known as cyclic carbonate, and one mol of an amine (II) of n primary amine functionality (monoamine or polyamine), with subsequently the conversion of at least one of the n hydroxyls formed in the β position with respect to each of the n urethane bonds and preferably of all the hydroxyls formed into ester-acids by equimolar reaction with a cyclic anhydride compound (IV), that is to say one mol of anhydride per hydroxyl, which reaction is followed by the conversion, with in this instance the conversion signifying complete conversion, of said acid functional groups into p acrylated or methacrylated end groups by reaction with a polyepoxide compound (V) carrying m epoxide functional groups with m equal at least to 2, m'=m−1 epoxide groups of which are converted into acrylate and/or methacrylate esters, with the final functionality p being at least equal to m' and preferably p being equal to m'*n for a complete conversion of said hydroxyls. If the conversion is partial x (x<1), in this case p=m'*x*n. According to a preferred option of the invention of said oligomer according to the invention, said conversion of said hydroxyls in the β position with respect to the urethane bond formed is a complete conversion with said overall functionality p being equal to m'*n. In the case of a partial conversion, it relates to at least one of said hydroxyls, which means that said oligomer must carry at least m'=m−1 acrylate and/or methacrylate groups. It should be specified that, when the overall functionality allows it, when p>1, a mixture of acrylate and methacrylate groups is also possible.

The overall acrylate and/or methacrylate functionality will depend on and can thus be adjusted by the functionality n of said amine (II) which reacts with said cyclic carbonate (III), thus forming, by its reaction with n cyclic carbonate compounds (monocarbonates as already explained above), n urethane bonds having, in the β position with respect to each urethane bond, an hydroxyl group and thus n hydroxyl groups formed per mole of said amine (II). The other factor on which the overall acrylate and/or methacrylate functionality will depend is the functionality of said polyepoxide compound (also indicated as epoxide compounds subsequently) with m epoxide functional groups (or it also being possible for epoxy functional groups to be used). In fact, the epoxide compound, which reacts with said acid functional group with one mol of epoxide compound (V) per acid functional group of the ester-acid which replaces the converted hydroxyls, reacts only with a single epoxide functional group or group among the m carried out at the start. The m−1 functional groups are converted, prior to, simultaneously with or subsequent to its reaction with said acid functional group, into acrylate and/or methacrylate groups respectively by reaction of m−1 mol of acrylic or methacrylic acid with one mol of said epoxide.

More particularly, the oligomer of the invention can comprise or can consist of the product of the following general formula (I):

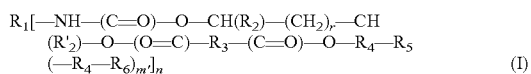

(I)

with:
R$_1$: hydrocarbyl of valence n in said amine compound (II), carrying n amine —NH$_2$ groups,
R$_2$ or R'$_2$: substituents which are identical or different and interchangeable in their position, which can be chosen from: H, alkyl or hydroxyalkyl, said alkyl being a C$_1$ to C$_3$ alkyl, with it being possible for R$_2$ and R'$_2$ to be located on two neighboring carbons, if r=0, or on two carbons separated by a methylene, if r=1, with it also being possible for the combined radical —CH(R$_2$)—(CH$_2$)$_r$—CH(R'$_2$)— to represent a C$_5$ or C$_6$ cycloalkylene radical forming, at the start (before reaction), part of the ring of said cyclic carbonate compound (III).
R$_3$: alkylene radical, in particular C$_2$ alkylene radical, cycloalkylene radical or arylene radical which can be substituted, in particular by an alkyl from methyl or ethyl or by a halogen, such as chlorine, or by an alkoxy or be unsubstituted, R$_3$ forming, at the start (before reaction), part of an anhydride ring of a cyclic anhydride compound (IV),
R$_4$—R$_5$(—R$_4$—)$_{m'}$ being the hydrocarbyl residue of overall valence m (m'=m−1), corresponding to said epoxide compound (V) after reaction of the m epoxide groups, with R$_4$ representing the —CH$_2$—CH(OH)— radical, the precursor of which is an epoxy (oxirane) group, and R$_5$ being the hydrocarbyl radical of valence m in said epoxide compound (V) carrying, at the start, m precursor epoxide (oxirane) groups of said radical R$_4$, it being possible for said compound (V) to be, inter alia, a hydrocarbon chain epoxidized on the carbons forming said chain,
R$_6$: CH$_2$=C(R$_7$)—(C=O)—O— being acrylate when R$_7$ is —H or methacrylate when R$_7$ is —CH$_3$ or a mixture of two groups, acrylate and methacrylate, for p>1, said oligomer being monofunctional, that is to say having p=m'*n equal to 1, or multifunctional, that is to say having p=m'*n equal to 2 or greater than 2.

Said oligomer can be monofunctional, with p=m'*n=1, m'=1 and n=1.

It can also be multifunctional and of functionality p=m'*n=2 or greater than 2 with m'≥1 and n≥2. According to another possibility of multifunctional oligomer of the invention, it can have a functionality p=m'*n=2 or greater than 2 with m'≥2 and n≥1.

In the more particular case of multifunctional oligomer of the invention, it can have a functionality p=m'*n ranging from 2 to 32 and preferably from 2 to 16, more preferably from 2 to 8 and in particular from 2 to 6. This will depend, as explained above, on the choice of the functionality, essentially of the functionality n of the polyamine (II) involved and also of the functionality m of the epoxide compound (V) used.

Selection may be made, as suitable cyclic anhydride compound (IV), from cyclic monoanhydrides and in particular the following: succinic (R$_3$: ethylene), maleic (R$_3$: vinylene), phthalic (R$_3$: 1,2-phenylene), itaconic, chlorendic, nadic, tetrahydrophthalic, hexahydrophthalic, methylhexahydrophthalic, methyltetrahydrophthalic, naphthenic dicarboxylic, trimellitic, glutaric, adipic, sebacic or dodecylsuccinic anhydride and preferably succinic, maleic, itaconic, phthalic, tetrahydrophthalic, hexahydrophthalic, methylhexahydrophthalic or methyltetrahydrophthalic anhydrides.

As regards the cyclic carbonate compound (III), it is, as explained above, a cyclic monocarbonate, that is to say a compound carrying just one carbonate ring. Said carbonates can be formed by reaction of one mol of a monoepoxide with one mol of carbon dioxide (CO$_2$). It is a route particularly favored in the context of the capture of CO$_2$ and of the reduction of emissions of this gas into the atmosphere in order to reduce global warming. Any monoepoxide converted by this route may be suitable, and also, for example, any monoalcohol glycidyl ether. More particularly, the following may be suitable as cyclic carbonates (III) according to the invention: cyclic carbonates from carbonates of ethylene glycol (R$_2$=R'$_2$: —H and r=0), of 1,3-propylene diol (R$_2$=—H, R'$_2$: —CH$_3$, r=0), of 1,2-propylene diol (R$_2$=R$_2$: —H, r=1), of glycerol (R$_2$: H, R$_2$: —CH$_2$—OH, r=0), of 1,2-butanediol (R$_2$: —H and R'$_2$: —CH$_2$CH$_3$), of 2,3-butanediol (R$_2$ and R'$_2$: —CH$_3$) and of 1,3-butanediol (R$_2$ or R'$_2$=—CH$_3$ and r=1) or the carbonate corresponding to a glycidyl ether of C$_1$-C$_4$ alcohol or of phenol, by addition of CO$_2$ to the corresponding epoxide, and preferably of ethylene glycol, of 1,2-propylene glycol, of glycerol or of 1,2-butanediol.

Any epoxide of linear or branched monomer (or monomeric) structure or of linear or branched oligomer (or oligomeric) structure, in the case of oligomer preferably with a number-average molecular weight Mn of less than 1000 and preferably of less than 600 daltons (all the Mn values are in daltons), may be suitable as epoxide compound (V).

If said epoxide compound (V) is a diepoxide monomer, it can be chosen from: ethylene glycol diglycidyl ether, propylene glycol diglycidyl ether, butanediol diglycidyl ether, neopentyl glycol diglycidyl ether, hexanediol diglycidyl ether, cyclohexanedimethanol diglycidyl ether, hydrogenated or nonhydrogenated bisphenol A diglycidyl ether (BADGE), hydrogenated or nonhydrogenated bisphenol F diglycidyl ether (BFDGE), these compounds optionally being alkoxylated, for example with 1 to 4 alkoxy units, such as ethoxy and/or propoxy units, or terephthalic acid diglycidyl ester, tetrahydrophthalic acid diglycidyl ester or hexahydrophthalic acid diglycidyl ester.

As example of monomer epoxide of higher functionality, said compound (V) can be a triepoxide selected from: trimethylolpropane triglycidyl ether, glycerol triglycidyl ether or triglycidyl isocyanurate, or a tetraepoxide selected from: pentaerythritol tetraglycidyl ether or ditrimethylolpropane tetraglycidyl ether, or a hexafunctional, such as dipentaerythritol hexaglycidyl ether, all these compounds optionally being alkoxylated, for example with 1 to 4 alkoxy units, as described above.

Said epoxide compound (V) can thus also be an epoxy resin, such as epoxidized oils, in particular soybean oil, epoxidized polybutadiene or a condensation or addition prepolymer carrying epoxide (or oxirane epoxy) end groups. The functionality m of this epoxide compound must be at least 2 (at least diepoxide, also known as diepoxy). The polyepoxide compounds (V) can be glycidyl ethers of diols or of polyols of higher functionality, which are optionally alkoxylated. The number of alkoxy units can vary from 1 to 15 and preferably from 1 to 5 per epoxide branch, alkoxy preferably being ethoxy and/or propoxy. Mention may be made, as suitable diepoxides, of alkoxylated or nonalkoxylated BADGE or bisphenol A diglycidyl ether or the diglycidyl ether of a diol, for example of ethylene glycol or propylene glycol or tetramethylene glycol (butanediol), it being possible for these diols to be optionally alkoxylated.

For higher functionalities m having a more specific and preferred advantage when it is desired to have the highest overall acrylate and/or methacrylate functionality, use may be made, as suitable, of polyepoxides having a functionality of at least 3. According to this specific option, a polyepoxide (V) can be chosen in this case from: a triepoxide selected from: trimethylolpropane triglycidyl ether, triglycidyl isocyanurate or glycerol triglycidyl ether with optional alkoxylation, or a tetraepoxide selected from: pentaerythritol tetraglycidyl ether or ditrimethylolpropane tetraglycidyl ether which is optionally alkoxylated, or from hexafunctionals, for example optionally alkoxylated dipentaerythritol glycidyl ether.

More particularly, said polyepoxide compound (V) can be an oligomer selected from: an epoxy resin with a number-average weight Mn<1000, preferably <600, chosen from: epoxidized, linear or branched, phenol-formaldehyde (novolac) resins, epoxidized oils, in particular epoxidized soybean oil, epoxidized polybutadiene or epoxidized condensation or addition prepolymer, in particular an amine-epoxy precondensate with epoxide end groups.

As regards said amine $R_1(NH_2)_n$ (II), it can be of monomer or oligomer structure, preferably a $C_2$ to $C_{54}$, in particular $C_2$ to $C_{36}$, aliphatic amine or an arylaliphatic amine or a cycloaliphatic amine.

Mention may be made, as suitable example of $C_2$ to $C_{54}$ aliphatic amine, of a monoalkylamine with $C_2$ to $C_{54}$ alkyl, that is to say such as ethylamine, propylamine, butylamine, pentylamine, hexylamine, heptylamine, octylamine, nonylamine, decylamine, undecylamine, dodecylamine (or laurylamine), hexadecylamine, octadecylamine or $C_{22}$ to $C_{54}$ fatty amine. Mention may also be made, as diamines, of the alkylenediamines corresponding to these alkyls. Mention may also be made, as aliphatic amines, of monoamines or polyamines derived from polyalkyleneimines and in particular oligoethyleneimine and/or oligopropyleneimine amines, diamines or polyamines comprising from 2 to 4 alkyleneimine units.

Mention may be made, as examples of cycloaliphatic amines, of isophoronediamine, bis(4-aminocyclohexyl)methane, 4,4'-cyclohexylenediamine or bis(3-methyl-4-aminocyclohexyl)methane (BMACM) or a diamine based on two amino-furan substituents on the dimethylmethylene of a difurfuryldiamine, as described in U.S. Pat. No. 5,292,903, the last amines being of renewable source starting from biomass. Mention may be made, as examples of arylaliphatic amines, of toluylyleneamine or xylylenediamine.

According to a particularly preferred case of oligomer according to the invention, said amine $R_1(NH_2)_n$ (II) is a monoamine monourethane or a diamine diurethane, which are the condensation products of a primary diamine with respectively a cyclic monocarbonate, which may be identical to or different from said cyclic carbonate compound (III) as defined according to the invention above, or a cyclic dicarbonate, that is to say a compound carrying two cyclic carbonates groups, and correspond to a ratio of primary amine ($—NH_2$) groups to cyclic carbonates groups of 2. According to this specific case, $n_1=n$ hydroxyls per amine compound (II) are present in the β position with respect to the urethane bond formed by carbonate-amine reaction in said monoamine urethane or in said diamine diurethane and these $n_1=n$ hydroxyls are also converted, for at least one group among them (from $n_1=n$) and preferably completely ($n_1=n$ from n), by successive reactions with said cyclic anhydride (IV) as defined above according to the invention, into ester-acid groups, followed by the conversion of said acid functional groups into at least m' additional acrylated and/or methacrylated end groups by reaction with said polyepoxide compound (V) as defined above according to the invention, with in this case an additional acrylate and/or methacrylate group (functional group) functionality of said oligomer equal to at least m' and preferably, for a complete conversion of said $n_1$ hydroxyls, with an additional functionality equal to $m'*n_1=m'*n$. If a monoamine urethane is concerned, in this case this additional functionality is equal to m' and, if the conversion by reaction with the cyclic anhydride (IV) of hydroxyls formed by reaction with the carbonate (III) is a complete conversion, in this case the overall functionality f will be equal to $m'*n+m'*n^1=2m'*n=2m'$ and thus the overall functionality f would depend directly on the functionality m of the epoxide compound (V), given that m'=m−1. For example, for a diepoxide (m=2) compound (V), the overall functionality will be 2 and, for a triepoxide 4. If a diamine diurethane is concerned, in this case the functionality p for a complete conversion will be equal to $m'*n=2m'$ and the additional functionality will be equal to $p=m'*n_1=m'*n=2m'$ and thus the overall functionality f will be equal to $2m'*n=4m'$. For example, in the latter case, if the epoxide compound (V) is a diepoxide (m=2 and m'=1), the overall functionality f will be 4 and, if a triepoxide is used as epoxide compound (V), in this case the overall functionality will be equal to 8. The number u of urethane bonds in said oligomer will be equal to $u=n+n_1=2n$, which means that, for a monoamine urethane (n=1), there will be 2 urethanes per oligomer and, in the case of a diamine diurethane (n=2), u will be equal to 4.

Analogous polyurethane-polyamines of functionality n>2 can also be envisaged as suitable amine $R_1(NH_2)_n$ by reaction between polycarbonates carrying more than 2 cyclic groups per molecule, which can be obtained by an addition reaction of $CO_2$ to oxirane functional groups of polyepoxides (or multiepoxides) of corresponding functionality, and diamines with a ratio in moles of diamine/polycarbonate being n (n moles of diamine per mole of polycarbonate). The advantage of such an option is that the number of urethane bonds in the oligomer of the invention is double the functionality n of the amine or polyamine (II) and without any use of isocyanate or of harmful products, including without the use of tin-based catalysts which are commonly used for lack of this amine-carbonate chemistry. More urethane functional groups means improvement in the performances of cohesion, flexibility, abrasion resistance and durability of the final material in use.

Another particularly advantageous possibility relating to the choice of the amine $R_1(-NH_2)_n$ is that said radical $R_1$ can carrying at least $n_2$ hydroxyls different from the hydroxyls formed in the β position with respect to a urethane bond by amine-carbonate reaction and that said $n_2$ hydroxyls are also converted by successive reactions with said cyclic anhydride (IV) as defined above into as many ester-acid groups, followed by the conversion of said acid functional groups into m'*$n_2$ additional acrylated or methacrylated end groups by reaction with said polyepoxide compound (V) as defined above according to the present invention, with in this case the overall acrylate or methacrylate group (functional group) functionality thus being increased by m'*$n_2$. According to this option, $n_2$ can vary from 1 to 3 hydroxyls per amine (II). Mention may be made, as suitable examples of monoamine (II) with 1 hydroxyl group, of ethanolamine (or 2-aminoethanol) and, with 2 hydroxyl groups, of 2-amino-2-methylpropane-1,3-diol or 3-aminopropane-1,2-diol.

Another possibility, for said $n_1$ and $n_2$ hydroxyls potentially present in the amine (II) as described above, is that at least one of said $n_1$ hydroxyls or $n_2$ hydroxyls as defined according to the invention above are converted to said acrylates or methacrylates with the respective additional functionality being, in this case, at least m'. This means that the conversion of said hydroxyls may not be complete conversion, in which case there will be present, in the final oligomer, up to $n_1-1=n-1$ and $n_2-1$ free hydroxyls per oligomer of the invention.

Likewise, according to a specific version, it is possible for hydroxyls originating from the reaction of said amine (II) with said carbonate (III) not to be all converted into acrylates or methacrylates (with at least one of said n hydroxyls being actually converted). This is valid only when n is at least 2 as, if n=1, with at least 1 hydroxyl converted, this means a complete conversion with respect to the hydroxyls formed. Depending on the total number of free residual hydroxyls left in the final oligomer, this oligomer will have an OH number suitable for a grafting reaction (if acrylate or methacrylate functionality is equal to 1) or a crosslinking reaction by the polycondensation or polyaddition route, for example in the presence of appropriate crosslinking agents, such as dianhydride or melamine or polyisocyanate or silane, this crosslinking being dual and superimposed on that by the radical route, for example by radiation, such as UV radiation, or by peroxides or by both superimposed (hybrid route), for the acrylates or methacrylates carried by said oligomer according to the present invention.

According to a preferred case of oligomer according to the invention, said oligomer carries, in addition to the acrylate and/or methacrylate groups, free hydroxyl groups, preferably at least 2 per oligomer.

According to other specific options of choice for the amine $R_1(-NH_2)_n$ (II), the latter can be an oligomer having a number-average weight Mn of less than 1500, preferably of less than 750, of linear or branched or hyperbranched or dendrimer structure, the latter being particularly advantageous for its high functionality per unit of weight and by the uniform distribution of the end acrylate or methacrylate groups.

According to this option, said amine $R_1(-NH_2)_n$ (II) can in particular be an oligomer based on polyalkyleneimine, with said alkylene preferably being ethylene, propylene or butylene (tetramethylene), more preferably ethylene, or a polyether amine or a polyamide amine or a polyesteramide amine or an amine-epoxide addition prepolymer or an amine having as $R_1$ radical, a fatty chain corresponding to or based on fatty acid dimer ($C_{36}$) or of trimer ($C_{54}$).

More particularly, the urethane oligomer such as comprising or consisting of an oligomer represented by the formula (I) described above can be the product of the following successive reactions:
i) carbonate-amine reaction between a cyclic carbonate (III) including, in its ring, the $-CH(R_2)-(CH_2)_r-CH(R_2)-$ radical and an amine $R_1(-NH_2)_n$ (II) with formation of n urethane groups carried by the $R_1$ radical, each urethane group having an hydroxyl in the β position,
ii) esterification of at least one of the hydroxyl groups generated in the β position with respect to said bond, preferably of all said hydroxyls, by a cyclic anhydride compound (IV) including, in its ring, a divalent organic radical $R_3$, with formation in place of said hydroxyl of an ester-acid group,
iii) reaction of the acid groups of said ester-acid group with an epoxide compound (V) carrying m epoxide groups which are precursors of the $R_4$ radical and which are carried by an organic radical $R_5$ of valence m, with m being at least 2, and with formation in place of each acid group of said ester-acid of an ester carrying m'=m−1 epoxide groups, said reaction iii) being followed by
iv) reaction with acrylic and/or methacrylic acid of said m−1 epoxide groups of said ester-epoxide group,
or, optionally, in said reaction iii), said epoxide compound (V) is replaced by the acrylated and/or methacrylated compound (VI) having m−1 acrylated and/or methacrylated epoxide groups (mixture if m'=m−1>1) before said reaction iii) or simultaneously with said reaction iii) and, in the latter case, by simultaneous reaction between said epoxide compound (V) and acrylic and/or methacrylic acid in a molar ratio of m'=m−1 mol of acrylic and/or methacrylic acid per mole of said epoxide compound (V), in which case (simultaneous reaction) said subsequent reaction according to iv) does not take place,
with $R_1$, $R_2$, $R'_2$, $R_3$, $R_4$, $R_5$, n, r and m being as defined according to the formula (I) described above.

The second subject matter of the invention is a process for the preparation of the oligomer as defined above according to the invention, which process comprises at least the following stages:
i) carbonate-amine reaction between a cyclic monocarbonate (carbonate) (III) and a monoamine or polyamine (II) of primary amine functionality n with formation of n urethane groups and, per urethane group, of an hydroxyl in the β position with respect to said bond (that is to say, n hydroxyls generated, as much as of urethane bonds thus created), ii) esterification of at least one from said (n) hydroxyl groups generated in the β position with respect to said urethane bond, preferably of all said hydroxyls, by a cyclic anhydride compound (IV) with formation, in place of said hydroxyl in the β position, of an ester-acid group, iii) reaction of the acid group of said ester-acid group with an epoxide group of a polyepoxide compound (V) carrying m epoxide groups with m equal to at least 2, with each new ester formed carrying m'=m−1 epoxide groups, iv) reaction, with acrylic acid and/or methacrylic acid, of said m'=m−1 epoxide groups in order to form m' acrylate and/or methacrylate groups, with as optional alternative for said stage iii), iiia) said polyepoxide (epoxide) compound (V) is replaced with its acrylated and/or methacrylated equivalent (VI) having m'=m−1 epoxide groups already preacrylated and/or premethacrylated (acrylate/methacrylate mixture if before said reaction iii)), or iiib) said acrylated or methacrylated compound (VI) is formed simultaneously with said reaction iii) and in this case by reaction, simultaneously with that of stage iii), between said epoxide compound (V) and acrylic or methacrylic acid and in a molar ratio of m−1 mol of acrylic or methacrylic acid per mole of said epoxide compound (V), in which case, according to options iiia) or iiib), said stage iv) has no reason to exist.

According to an alternative form of said preparation process, said oligomer has an additional functionality to that defined by p above in that at least one of the respectively $n_1$ or $n_2$ hydroxyls as defined above carried by said amine $R_1(NH_2)_n$ are also converted into acrylates and/or methacrylates according to the reactions of stages i), ii), iii) or iv) as defined in said process above.

The reaction of stage i) can be carried out within a temperature range extending from 20 to 100° C., preferably from 20 to 60° C.

The reaction of stage ii) can be carried out within a range extending from 60 to 120° C., with or without catalyst. Mention may be made, as examples of catalysts which can be used, of sodium acetate or tertiary amines.

The reactions of stages iii), iiia) and iiib) can be carried out within a temperature range extending from 50 to 100° C., preferably from 60 to 100° C., in the presence of catalyst, such as tertiary and quaternary amines or corresponding quaternary ammonium salts or organic chromium(III) salts or phosphines.

Another subject matter covered by the present invention relates to a polymerizable, in particular crosslinkable, composition which comprises at least one oligomer as defined above according to the invention or obtained by a process as also defined according to the invention. Said crosslinkable composition is chosen in particular from: a coating composition, more particularly a paint, varnish, ink, adhesive or gel coat composition, or a composition for 3D (three-dimensional) objects by successive layers or a crosslinkable molding composition or a composite composition or a leaktightness agent composition or a chemical sealing composition. A composition is crosslinkable if the number-average functionality of the reactive groups per reactive component is at least 2, for ethylenic unsaturations which react by the radical route, or greater than 2, for condensation or polyaddition reactions. This is already the case for compositions comprising an oligomer according to the invention having an acrylate or methacrylate functionality of at least 2. The crosslinking can also be the fact of a crosslinking agent carrying at least two unsaturations which can copolymerize with said oligomer or carrying more than two functional groups which can condense with or add to those of said oligomer according to the invention. Thus, the crosslinkable nature of said composition can be related to the functionality of said oligomer and/or to that of a crosslinking agent present in said composition and thus covers both possibilities. 3D objects are obtained by deposition and crosslinking according to a 3D form in successive layers until the final crosslinked 3D object is obtained.

As an alternative option to the crosslinkable option, said composition can be a polymerizable composition for the preparation of a grafted polymer preferably comprising, in addition to said oligomer as defined according to the invention, at least one comonomer which can be copolymerized by the radical route, preferably by the radiation route, in particular UV radiation route, and by the peroxide route or by a dual route which can resort to a reaction of crosslinking by condensation, in particular with a suitable crosslinking agent, and a superimposed (on said condensation) radical reaction.

Another subject matter covered by the invention relates to the use of an oligomer of the invention as described above as polymerizable urethane binder, with said use being devoid of any use of isocyanate and more particularly devoid of any use of isocyanate and a tin-based catalyst, preferably from the preparation and as far as the final application included of said oligomer. In the case where said oligomer has an overall acrylate and/or methacrylate functionality of at least 2, it is especially used as crosslinkable binder in crosslinkable compositions, in particular in coating compositions, such as paint, varnish, ink, adhesive and gel coat, or in compositions for 3D (three-dimensional) objects by successive layers or in molding compositions or in composite compositions, in particular based on fibers, or in leaktightness agent compositions or in chemical sealing compositions.

A further more specific use relates to an oligomer as defined above and having at least 2 acrylate and/or methacrylate groups and in addition at least two free hydroxyl groups per oligomer, said use being as organic binder in a composition which can be crosslinked by a dual and/or hybrid route, in particular by the radical route, such as radiation and/or peroxide, and which can be superimposed on a crosslinking by the condensation route, involving said functional group with an appropriate crosslinking agent which can be a dianhydride, a polyisocyanate or melamine or silane.

Another use, this time relating to an oligomer of the invention which is monofunctional in acrylates and/or methacrylates, is the use as macromonomer in the preparation of grafted polymers, in particular in the presence of a copolymerizable comonomer.

Finally, the invention also covers a finished product or article which is obtained by using at least one oligomer as defined above according to the invention, in particular chosen from coating, 3D object obtained by successive layers, molded part, composite material, leaktight seal or chemical sealing.

EXPERIMENTAL PART

1) Preparation of Oligomers According to the Invention

Example 1

341.02 g of Priamine® 1075 (Croda, equivalent weight $M_f$ of 275 g per amine functional group, a $C_{36}$ fatty diamine from fatty acid dimer) and 0.06 g of triphenyl phosphite are introduced into a 1 l reactor. 122.69 g of propylene carbonate (Huntsman, Mw 102 g/mol) are added over one hour at an unvarying flow rate, with stirring at ambient temperature. An exothermicity of approximately 15° C. is observed. At the end of the addition, the temperature of the mixture is brought to 60° C. After reacting at 60° C. for 1 hour, 13.41 g of acrylic acid, 1.23 g of 2,4,6-trimethyl-p-cresol, 1.23 g of HQME (hydroquinone methyl ether) and 124.13 g of succinic anhydride are added to the mixture. The temperature of the medium is increased to 90° C. The progress of the reaction is monitored by measuring the total acid number. When the total acid number is less than 181 mg KOH/g, 316 g of butanediol diglycidyl ether (of EMS-$M_f$=127.5 g/mol of epoxide functional groups), 67.0 g of acrylic acid and 2.1 g of tetraethylammonium chloride are added to the mixture and the temperature is brought to 120° C. The progress of the reaction is monitored by measuring the acid and epoxy numbers. Additions of acrylic acid and/or of trimethylolpropane triglycidyl ether are carried out in order to keep a difference of 3 points between the acid number and the epoxy number EN (AN+3=EN). The reaction is halted when the acid number AN is less than 2 mg KOH/g and the epoxy number EN is less than 5 mg KOH/g.

| Starting Materials | Parts by weight |
|---|---|
| Tetraethylammonium chloride | 4.0 |
| Propylene carbonate | 122.69 |
| Acrylic acid | 89.41 |
| Priamine 1075 | 341.02 |
| Triphenyl phosphite | 0.06 |
| Butanediol diglycidyl ether | 316.22 |
| 2,4,6-Trimethyl-p-cresol | 1.23 |
| HQME | 1.23 |
| Succinic anhydride | 124.13 |

Example 2

256.20 g of Priamine® 1075 (Croda-$M_f$=275 g/mol of amine functional group) and 0.05 g of triphenyl phosphite are introduced into a 1 l reactor. 92.18 g of propylene carbonate (Huntsman, Mw 102 g/mol) are added over one hour at an unvarying flow rate, with stirring at ambient temperature. An exothermicity of approximately 15° C. is observed. At the end of the addition, the temperature of the mixture is brought to 60° C. After reacting at 60° C. for 1 hour, 20.15 g of acrylic acid, 0.92 g of 2,4,6-trimethyl-p-cresol, 0.93 g of HQME and 93.26 g of succinic anhydride are added to the mixture. The temperature of the medium is increased to 90° C. The progress of the reaction is monitored by measuring the total acid number. When the total acid number is less than 152 mg KOH/g, 169.75 g of trimethylolpropane triglycidyl ether (EMS-$M_f$=149.6 g/mol of epoxide functional group), 100.76 g of acrylic acid and 2.1 g of tetraethylammonium chloride are added to the mixture and the temperature is brought to 120° C. The progress of the reaction is monitored by measuring the acid and epoxy numbers. Additions of acrylic acid and/or of trimethylolpropane triglycidyl ether are carried out in order to keep a difference of 3 points between the acid number and the epoxy number (AN+3=EN). The reaction is halted when the acid number is less than 2 mg KOH/g and the epoxy number is less than 5 mg KOH/g.

| Starting Materials | Parts by weight |
|---|---|
| Tetraethylammonium chloride | 4.0 |
| Propylene carbonate | 92.18 |
| Acrylic acid | 134.34 |
| Priamine 1075 | 256.20 |
| Triphenyl phosphite | 0.05 |
| Trimethylolpropane triglycidyl ether | 418.13 |
| 2,4,6-Trimethyl-p-cresol | 0.92 |
| HQME | 0.93 |
| Succinic anhydride | 93.26 |

2) Characteristics of the Products Prepared

| Characteristics | Unit | Example 1 | Example 2 |
|---|---|---|---|
| Functionality p (calculated) | | 2 | 4 |
| Noury viscosity | Pa · s | 6.7 (50° C.) | 16 (60° C.) |
| Rate of crosslinking under UV lamp | m/min | <1 | 25 |
| Persoz hardness | Number of oscillations | 37 | 44 |
| Pencil hardness according to ASTM D3363 | — | 6B | 4B |
| Flexibility | mm | 3 | 3 |
| Resistance to acetone | s | 6 | 57 |

The applicative properties are measured on a film crosslinked under a 120 W/cm "fusion" UV lamp starting from a mixture of urethane acrylate according to the invention and Darocur 1173 photoinitiator in the proportions of 96/4 w/w.

Methods Used

Determination of the reactivity (crosslinking rate): The mixture is applied as a 12 μm film to a contrast chart (Penoparc charts form 1B®, Leneta) and is then crosslinked using a 120 W/cm Hg Fusion lamp. The minimum rate of passage (in m/min) necessary in order to obtain a film dry to the touch is measured.

For the following tests of hardness, flexibility and resistance to acetone, the photocrosslinked films are left in a climate-controlled room (T=23° C.) for 24 hours after crosslinking and before the measurements.

Determination of the Persoz hardness: The mixture to be examined is applied as a 100 μm film to a sheet of glass and crosslinked by a 120 W/cm Hg Fusion lamp at a rate of 8 m/min. The number of oscillations, before the oscillations die out (change from 12° to 4° in amplitude), of a pendulum in contact with the coated sheet of glass is measured according to the standard ISO 1522.

Determination of the flexibility: The mixture is applied as a 100 μm film to a smooth sheet of steel of 25/10 mm in thickness (D-46® Q-Panel) and is then crosslinked by a 120 W/cm Hg Fusion lamp at a rate of 8 m/min.

The coated sheet is curved over cylindrical mandrels according to the standard ISO 1519. The result is expressed by the value (in mm) of the lowest radius of curvature which can be inflicted on the coating without it cracking or detaching from the support.

Determination of the resistance to acetone: The mixture is applied as a 12 μm film to a sheet of glass and then crosslinked by a 120 W/cm Hg Fusion lamp at a rate of 8 m/min. The coating is rubbed with a rag impregnated with acetone. The result is the time (expressed in seconds) beyond which the film detaches and/or disintegrates.

The invention claimed is:

1. A linear or branched urethane oligomer having at least p acrylate or methacrylate end groups, wherein said urethane bond is obtained without isocyanate by carbonate-amine reaction between cyclic monocarbonate (carbonate) (III) and amine (II) of n primary amine functionality which is a monoamine or polyamine, with subsequently conversion of at least one of n hydroxyls formed in β position with respect to each of the n urethane bonds, into ester-acids by reaction with cyclic anhydride compound (IV), which reaction is followed by conversion of said acid functional groups into p acrylate or methacrylate end groups by reaction with a polyepoxide compound (V) carrying m epoxide functional groups, with m equal at least to 2, m'=m−1 epoxide groups of which being converted into acrylate and/or methacrylate esters, and with the final functionality p being at least equal to m'.

2. The oligomer of claim 1 wherein said conversion of said hydroxyls is complete and said overall functionality p is equal to m'*n.

3. The oligomer of claim 2 comprising product of formula (I):

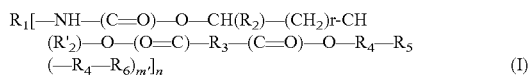

with
R$_1$: hydrocarbyl of valence n in said amine compound (II), carrying n amine NH$_2$groups,
R$_2$ or R'$_2$: substituents which are identical or different and interchangeable in their position, which are selected from the group consisting of: H, alkyl and hydroxyalkyl, said alkyl being a C$_1$ to C$_3$ alkyl, optionally with R$_2$ and R'$_2$ to be located on adjacent carbons, if r=0, or on two carbons separated by a methylene, if r=1, optionally with combined radical CH(R$_2$)—(CH$_2$)r-CH(R'$_2$) representing a C$_5$ or C$_6$ cycloalkylene radical forming before reaction, part of the ring of said cyclic carbonate compound (III),
R$_3$: selected from the group consisting of alkylene radical, cycloalkylene radical, and arylene radical which can be substituted, or unsubstituted, R$_3$ forming before reaction, part of an anhydride ring of a cyclic anhydride compound (IV),
R$_4$—R$_5$(—R$_4$—)m' being hydrocarbyl residue of overall valence m (m'=m−1), corresponding to said epoxide compound (V) after reaction of the m epoxide groups, with R$_4$ representing the CH$_2$—CH(OH) radical, the precursor of which is an epoxy (oxirane) group, and R$_5$ being the hydrocarbyl radical of valence m in said epoxide compound (V) carrying, at the start, m precursor epoxide (oxirane) groups of said radical R$_4$, optionally said compound (V) being a hydrocarbon chain epoxidized on the carbons forming said chain,
R$_6$: CH2=C(R$_7$)—(C=O)—O— being acrylate when R$_7$ is H or methacrylate when R$_7$ is CH$_3$ or a mixture of two groups, acrylate and methacrylate, for p>1,
said oligomer being monofunctional having m'*n equal to 1, or multifunctional having p=m'*n equal to 2 or greater than 2.

4. The oligomer as claimed in claim 1 wherein said oligomer is monofunctional with p=m'*n=1, m'=1 and n=1.

5. The oligomer as claimed in claim 1 wherein said oligomer is multifunctional and of functionality p=m'*n=2 or greater than 2 with m'≥1and n≥2.

6. The oligomer as claimed in claim 1 wherein said oligomer is multifunctional and of functionality p=m'*n=2 or greater than 2 with m'≥2 and n≥1.

7. The oligomer as claimed in claim 5 wherein said oligomer is multifunctional and of functionality p=m'*n from 2 to 32 .

8. The oligomer as claimed in claim 1 wherein said cyclic anhydride compound (IV) is selected from the group consisting of: succinic (R3: ethylene), maleic (R3: vinylene), phthalic (R3: 1,2 phenylene), itaconic, chlorendic, nadic, tetrahydrophthalic, hexahydrophthalic, methylhexahydrophthalic, methyltetra-hydrophthalic, naphthenic dicarboxylic, glutaric, trimellitic, adipic, sebacic dodecylsuccinic anhydride, tetrahydro-phthalic, hexahydrophthalic, and methyltetrahydrophthalic anhydrides.

9. The oligomer as claimed in claim 1 wherein said cyclic carbonate (III) is chosen from the group consisting of carbonates of ethylene glycol (R$_2$=R'$_2$; H and r=0), of 1,3-propylene diol (R$_2$=—H, R'$_2$: —CH$_3$, r=0), of 1,2-propylene diol (R$_2$=R'$_2$: H, r=1), of glycerol (R$_2$: H, R$_2$: —CH$_2$—OH, r=0), of 1,2butanediol (R2: —H and R'$_2$: —CH$_2$CH$_3$), of 2,3 butanediol (R$_2$ and R'$_2$: —CH$_3$) and of 1,3 butanediol (R$_2$ or R'$_2$=—CH$_3$ and r=1) and the carbonate corresponding to a glycidyl ether of C$_1$-C$_4$ alcohol or of phenol, by addition of CO$_2$ to the corresponding epoxide.

10. The oligomer as claimed in claim 1 wherein said epoxide Compound (V) is a diepoxide monomer selected from the group consisting of: ethylene glycol diglycidyl ether, propylene glycol diglycidyl ether, butanediol diglycidyl ether, neopentyl glycol diglycidyl ether, hexanediol diglycidyl ether, cyclohexanedimethanol diglycidyl ether, hydrogenated and nonhydrogenated bisphenol A diglycidyl ether (BADGE), hydrogenated and nonhydrogenated bisphenol F diglycidyl ether (BFDGE), optionally being alkoxylated, terephthalic acid diglycidyl ester, tetrahydrophthalic acid diglycidyl ester and hexahydrophthalic acid diglycidyl ester.

11. The oligomer as claimed in claim 1 wherein said epoxide compound (V) is either a triepoxide selected from the group consisting of: trimethylolpropane triglycidyl ether, glycerol triglycidyl ether and triglycidyl isocyanurate, or a tetraepoxide selected from the group consisting of: pentaerythritol tetraglycidyl ether and ditrimethylolpropane tetraglycidyl ether, or dipentaerythritol hexaglycidyl ether, all of these optionally being alkoxyated.

12. The oligomer as claimed in claim 1 wherein said epoxy compound (V) is an epoxy resin with a number-average weight Mn<1000, chosen from the group consisting of: epoxidized, linear and branched, phenol-formaldehyde (novolac) resins, epoxidized oils, epoxidized polybutadiene and epoxidized condensation and addition prepolymer.

13. The oligomer as claimed in claim 1 wherein said amine R$_1$(NH$_2$)n (II) has monomer or oligomer structure.

14. The oligomer as claimed in claim 1 wherein said amine R$_1$(NH$_2$)n (II) is a monoamine monourethane or a diamine diurethane, which are the condensation products of a primary diamine with respectively a cyclic monocarbonate, which may be identical to or different from said cyclic carbonate compound (III), or a cyclic dicarbonate having two cyclic carbonate groups, and correspond to a ratio of primary amine groups to cyclic carbonates groups of 2.

15. The oligomer as claimed in claim 14, wherein n$_1$=n hydroxyls per amine compound (II) are present in the β position with respect to the urethane bond formed by carbonate-amine reaction in said monoamine urethane or in said diamine diurethane and that these n$_1$=n hydroxyls are also converted, for at least one group among them, by successive reactions with said cyclic anhydride (IV), into ester-acid groups, followed by the conversion of said acid functional groups into at least m' additional acrylated or methacrylated end groups by reaction with said polyepoxide compound (V) with an additional acrylate or methacrylate group functionality of said oligomer equal to at least m'.

16. The oligomer as claimed in claim 14 wherein said amine $R_1(NH_2)$n comprises, in said radical $R_1$, at least $n_2$ hydroxyl different from the hydroxyls formed in the β position with respect to a urethane bond by amine-carbonate reaction and that said $n_2$ hydroxyls are converted by successive reactions with said cyclic anhydride (IV) into as many ester-acid groups, followed by conversion of said acid functional groups into m'*n2 additional acrylated or methacrylated end groups by reaction with said polyepoxide compound (V), with the overall acrylate or methacrylate group functionality being increased by m'*n2.

17. The oligomer as claimed in claim 14 wherein at least one of said $n_1$ hydroxyls or $n_2$ hydroxyls are converted to said acrylates or methacrylates with the respective additional functionality being at least m'.

18. The oligomer as claimed in claim 13, wherein said amine $R_1$(—$NH_2$)n (II) is an oligomer having a number-average weight Mn of less than 1500, of linear or branched or hyperbranched or dendrimer structure.

19. The oligomer as claimed in claim 17, wherein said amine $R_1$(—$NH_2$)n (II) is an oligomer based on polyalkyleneimine, with said alkylene being ethylene, propylene or butylene (tetramethylene), or a polyether amine or a polyamine amine or a polyesteramide amine or an amine-epoxide addition prepolymer or an amine having as $R_1$ radical, a fatty chain corresponding to fatty acid dimer or of trimer.

20. The oligomer as claimed in claim 14 wherein said oligomer carries, in addition to the acrylate and/or methacrylate groups, free hydroxyl groups.

21. The urethane oligomer as claimed in claim 3 which is the product of the following successive reactions:
  i) carbonate-amine reaction between a cyclic carbonate (III) including, in its ring, the —CH($R_2$)—$CH_2$)r-CH ($R_2$)— radical and an amine R1(—$NH_2$)$_n$ (II) with formation of n urethane groups carried by the $R_1$ radical, each urethane group having an hydroxyl in theft β position,
  ii) esterification of at least one of the hydroxyl groups generated in the β position with respect to said bond, by a cyclic anhydride compound (IV) including, in its ring, a divalent organic radical $R_3$, with formation in place of said hydroxyl of an ester-acid group,
  iii) reaction of the acid groups of said ester-acid group with an epoxide compound (V) carrying m epoxide groups which are precursors of the $R_4$ radical and which are carried by an organic radical $R_5$ of valence m, with m being at least 2, and with formation in place of each acid group of said ester-acid of an ester carrying m'=m−1 epoxide groups, said reaction iii) being followed by
  iv) reaction with acrylic and/or methacrylic acid of said m−1 epoxide groups of said ester-epoxide groups, or, optionally, in said reaction iii), said epoxide compound (V) is replaced by the acrylated and/or methacrylated compound (VI) having m−1 acrylated and/or methacrylated epoxide groups (mixture if m'=m−1>1) before said reaction iii) or simultaneously with said reaction iii) and, in the latter case, by simultaneous reaction between said epoxide compound (V) and acrylic and/or methacrylic acid in a molar ratio of m'=m−1mol of acrylic and/or methacrylic acid per mol of said epoxide compound (V), in which case (simultaneous reaction) said subsequent reaction according to iv) does not take place, with $R_1$, $R_2$, $R'_2$, $R_3$, $R_4$, $R_5$, n, r and m being defined according to claim 3.

22. A process for the preparation of an oligomer according to claim 1 comprising the following reaction steps:
  i) carbonate-amine reaction between a cyclic monocarbonate (carbonate) (III) and a monoamine or polyamine (II) of primary amine functionality n with formation of n urethane groups and, per urethane group, of an hydroxyl in the β position with respect to said bond,
  ii) esterification of at least one of said hydroxyl groups generated in the β position with respect to said urethane bond, by a cyclic anhydride compound (IV) with formation, in place of said hydroxyl in the β position, of an ester-acid group,
  iii) reaction of the acid group of said ester-acid group with an epoxide-group of a polyepoxide compound (V) carrying m epoxide groups with m equal to at least 2, with each new ester formed carrying m'=m−1 epoxide groups,
  iv) reaction, with acrylic acid and/or methacrylic acid, or said m'=m−1 epoxide groups in order to form m' acrylate and/or methacrylate groups,
  with as optional alternative for said iii),
  iiia) said polyepoxide (epoxide) compound (V) is replaced with its acrylated and/or methacrylated equivalent (VI) having m'=m−1 epoxide groups preacrylated and/or premethacrylated,
  or
  iiib) said acrylated or methacrylated compound (VI) is formed simultaneously with said reaction and by reaction, simultaneously with that of stage iii), between said epoxide compound (V) and acrylic or methacrylic acid and in a molar ratio of m−1 mol of acrylic or methacrylic acid per mol of said epoxide compound (V),
  in which case, according to options iiia) or iiib), said iv) has no reason to exist.

23. A polymerizable composition comprising at least one oligomer according to claim 1.

24. The composition of claim 23 which is crosslinkable and is a paint, varnish, ink, an adhesive, or a sealant.

25. The composition of claim 23 which is a polymerizable composition for the preparation of a grafted polymer comprising at least one comonomer which can be copolymerized by the radical route.

* * * * *